(12) United States Patent
Akiyama

(10) Patent No.: US 6,653,261 B2
(45) Date of Patent: Nov. 25, 2003

(54) HIGH SPEED ROLLING BEARING

(75) Inventor: Motoharu Akiyama, Nagano-ken (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/180,377

(22) Filed: Jun. 26, 2002

(65) Prior Publication Data

US 2003/0027725 A1 Feb. 6, 2003

(30) Foreign Application Priority Data

Jun. 27, 2001 (JP) ........................................ 2001-194965

(51) Int. Cl.⁷ .................. C10M 169/02; C10M 115/08; F16C 33/12
(52) U.S. Cl. ...................................... 508/100; 508/552
(58) Field of Search ................................. 508/100, 101, 508/102, 103, 104, 105, 106, 107, 108, 109, 552

(56) References Cited

U.S. PATENT DOCUMENTS

| | | | | |
|---|---|---|---|---|
| 4,534,871 A | * | 8/1985 | Johnson ....................... | 508/100 |
| 5,043,085 A | * | 8/1991 | Kinoshita et al. ............. | 408/30 |
| 5,301,923 A | * | 4/1994 | Asao et al. .................. | 508/410 |
| 5,385,412 A | * | 1/1995 | Yatabe et al. ................ | 384/492 |
| 5,462,684 A | * | 10/1995 | Naka et al. .................. | 508/485 |
| 5,707,944 A | * | 1/1998 | Yokouchi et al. ............ | 508/485 |
| 5,728,020 A | * | 3/1998 | Muranaka et al. ........... | 474/199 |
| 5,910,470 A | * | 6/1999 | Minami et al. .............. | 508/468 |
| 5,981,448 A | * | 11/1999 | Matsui et al. ................ | 508/101 |
| 6,196,720 B1 | * | 3/2001 | Nozaki et al. ................ | 384/13 |
| 6,339,049 B1 | * | 1/2002 | Funahashi et al. .......... | 508/100 |
| 6,343,682 B1 | * | 2/2002 | Terada et al. ................ | 192/45 |
| 6,417,143 B1 | * | 7/2002 | Mikami et al. .............. | 508/465 |

FOREIGN PATENT DOCUMENTS

JP   2000-337380   12/2000

* cited by examiner

Primary Examiner—Jacqueline V. Howard
(74) Attorney, Agent, or Firm—Flynn, Thiel, Boutell & Tanis, P.C.

(57) ABSTRACT

A high speed rolling bearing having a long life, low rotation torque and small leakage amount of a grease, is provided. The high speed rolling bearing is made up of retainers disposed so as to surround respective rolling elements between an outer member and an inner member thereof, and the respective rolling elements roll against a first contact face which is a contact face thereof with the outer member as well as a second contact face which is a contact face thereof with the inner member. The retainers are made of a polyamide and retain a grease composition composed of a thickener and a base oil composed of a synthetic hydrocarbon oil having a kinematic viscosity at 40° C. in a range of 50 to 70 mm²/s and containing 3 to 6 mass % of hydrocarbon molecules containing 28 to 32 carbon atoms.

8 Claims, 1 Drawing Sheet

HIGH SPEED ROLLING BEARING

BACKGROUND OF THE INVENTION

1. Field of the Invention

The present invention relates to a high speed bearing for use in a cleaner, and in particular, to a high speed rolling bearing suited for revolution at not less than 50,000 rpm.

2. Description of the Related Art

With a bearing for a cleaner used at a revolution of less than 50,000 rpm, there have not thus far arisen problems with the torque and life thereof because of the low rpm. However, out of necessity of raising a sucking force of the cleaner in order to enhance the operating efficiency thereof, the revolution speed of the cleaner has since been increased to 50,000 rpm or 60,000 rpm. At the same time, there have since arisen needs to meet demands for a lower torque in order to reduce consumption of electric power from the viewpoint of energy conservation, and further, for a longer life of a bearing product.

In meeting various demands required of a high speed bearing for a cleaner, used in such applications as described, a conventional high speed bearing used for a cleaner has encountered problems such as an increase in rotation torque, and shorter life caused by scattering and leakage of grease due to a centrifugal force acting thereon.

It is therefore an object of the invention to provide a bearing for use in a cleaner, and in particular, a high speed rolling bearing suited for revolution at not less than 50,000 rpm.

That is, the invention has established that a bearing of a long life, having a low rotation torque and only a little leakage of grease, can be manufactured by use of a grease of a specific composition in combination with a retainer of the bearing, made of a material of a specific quality.

SUMMARY OF THE INVENTION

The present invention has been developed by finding out that if a grease containing a synthetic hydrocarbon oil as a base oil thereof, having a kinematic viscosity at 40° C. in a range of 50 to 70 mm$^2$/s, and containing 3 to 6 mass % of hydrocarbon molecules containing 28 to 32 carbon atoms is retained by retainers made of a polyamide, the grease is effective for use in a high speed rolling bearing such as a bearing used in a cleaner.

DESCRIPTION OF THE PREFERRED EMBODIMENTS

Figure 1:
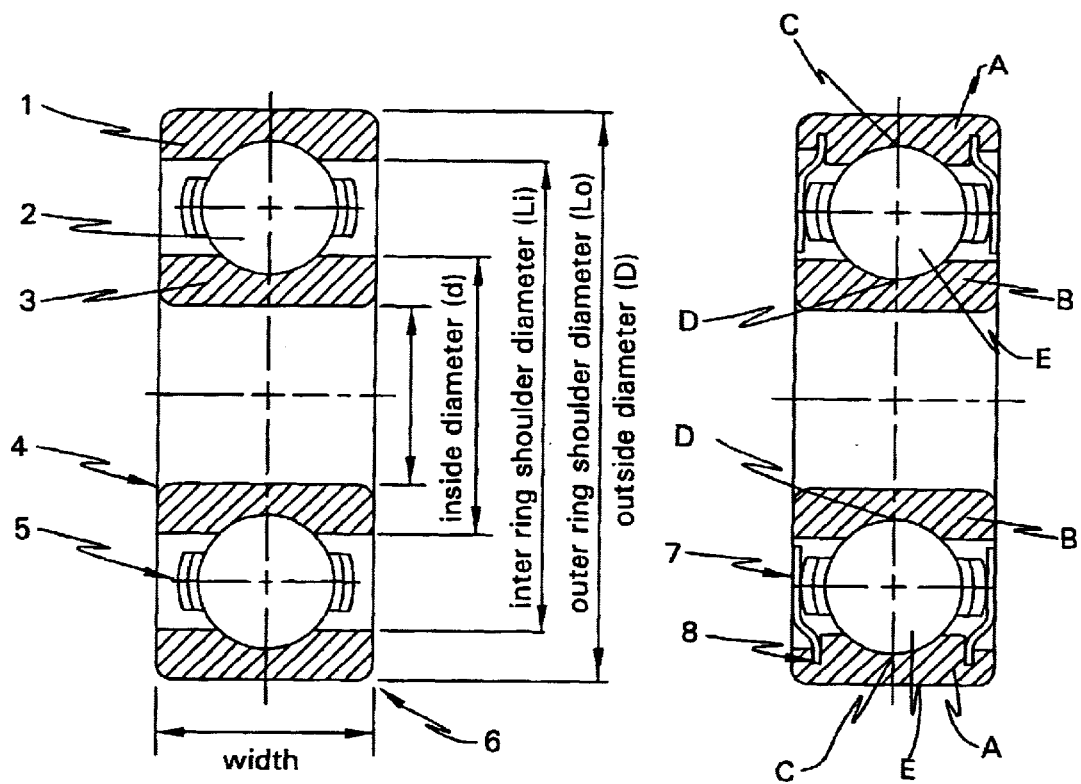
FIG. 1 is a cross-sectional view of a typical high speed rolling bearing.

FIG. 1 shows a ball bearing which is a typical bearing according to the invention. In FIG. 1, reference numerals A to E represent an abstract concept on components of the ball bearing of the invention, reference numeral A denoting an outer member, B an inner member, C a first contact face, D a second contact face, and E rolling elements, respectively.

More specifically, reference numeral 1 denotes an outer ring, 2 balls, 3 an inner ring, 4 inner ring chamfering, 5 retainers, 6 outer ring chamfering, 7 shields, and 8 snap rings. Further, d denotes an inside diameter, Li an inner ring shoulder diameter, Lo an outer ring shoulder diameter, and D an outside diameter of the ball bearing.

The inventor of the present invention has discovered that, in a bearing comprising retainers made of a polyamide, and rolling elements, a novel effect can be obtained by use of a grease of a specific composition.

The polyamide used in the retainers of the invention may be any class of polyamide, and there has been observed a synergistic effect between the polyamide and the specific grease for use in carrying out the invention. Examples of preferable polyamides include nylon-66, and nylon-6.

Further, as a constituent material of the outer member, the inner member, and the rolling elements, which are used in a rolling unit of the invention, high-performance chromium bearing steel or martensitic stainless steel is used. As the high-performance chromium bearing steel, there is available high-quality high-performance chromium bearing steel produced by the vacuum degassing process (JIS G4805SUJ2, AISI/SAE 52100), and as the martensitic stainless steel, there are available DD400, SUS440C (JIS G430344C, AIS1440C).

Further, as the constituent material of the rolling elements, boron nitride ceramic can be used besides those described above.

The grease for use in carrying out the invention is composed of a base oil and a thickener, and a synthetic hydrocarbon oil having a kinematic viscosity of 50 to 70 mm$^2$/s at 40° C. is used as the base oil while a urea compound is used as the thickener.

With the use of a synthetic hydrocarbon oil having a kinematic viscosity of less than 50 mm$^2$/s, scattering and leakage of the grease occurs at the time of revolution at not less than 50,000 rpm, thereby shortening the life of the bearing while when the kinematic viscosity of the synthetic hydrocarbon oil exceeds 70 mm$^2$/s, the rotation torque of the bearing increases, resulting in a loss of energy. For these reasons, the kinematic viscosities as described above is not desirable.

The synthetic hydrocarbon oil for use in carrying out the invention is required to contain 3 to 6 mass % of the hydrocarbon molecules containing 28 to 32 carbon atoms. In case the content of the hydrocarbon molecules containing 28 to 32 carbon atoms is less than 3 mass %, the torque of the bearing becomes higher with an increase in rpm, reaching an extremely high level particularly at 50,000 rpm and greater. On the other hand, in case the content of the hydrocarbon molecules containing 28 to 32 carbon atoms exceeds 6 mass %, the leakage of the grease increases, resulting in a shorter life of the bearing.

Further, the synthetic hydrocarbon oil for use in carrying out the invention contains not less than 70 mass % of hydrocarbon molecules containing not less than 48 carbon atoms. The major constituent of the synthetic hydrocarbon oil used in carrying out the invention is a hydrocarbon molecule containing not less than 48 carbon atoms, and a content of the hydrocarbon molecules in the synthetic hydrocarbon oil is in a range of 70 to 85 mass %.

The synthetic hydrocarbon oil used in carrying out the invention can be adjusted by suitably mixing various classes of poly α-olefins (PAO), olefins which are available in the market, with each other so as to meet the conditions described above.

Examples of poly α-olefins (PAO) for use in carrying out the invention include oligomers such as a dimer, a trimer, and a tetramer, including 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, and 1-docosene, and so forth.

A content of a synthetic hydrocarbon oil in the grease for use in carrying out the invention is preferably in a range of 75 to 95 mass %, and more preferably 80 to 90 mass %.

The thickener contained in the grease for use in carrying out the invention is preferably a urea-based thickener, particularly a diurea compound having two urea-bonds in one molecule. Among diurea compounds, a diurea compound having an end group which is aliphatic or alicyclic is preferable.

The thickener in the grease for use in carrying out the invention is used so as to adapt to the consistency of the grease, as intended, and a content of the thickener is normally on the order of 8 to 18 mass t.

The grease for use in carrying out the invention may contain an antioxidant, an extreme pressure lubricant, a rust preventative, a corrosion inhibitor, an oiliness improver, and so forth, which are commonly blended with grease.

Examples of antioxidants include a phenol compound and an aromatic amine compound. For example, a phenol antioxidant such as 2, 6-di-t-butyl-4-methyl phenol, an amine antioxidant such as p,p'-dioctyldiphenyl-amine, and so forth are included.

Such antioxidants as described above can be used individually, or two classes or more thereof can be mixed together before use. A suitable content of the antioxidants in the grease for use in carrying out the invention is in a range of 0.5 to 5 mass %.

The grease for use in carrying out the invention can be prepared by a conventional method known publicly.

Embodiments
Example of Preparing Grease

A grease was prepared by use of 14 mass % of a diurea compound of a mixture of alicyclic/aliphatic series (diurea compound obtained through reaction among 5 mol. diphenylmethane 4,4'-diisocyanate, 3 mol. cyclohexylamine, and 7 mol. stearylamine) as a thickener, 2.5 mass % of an amine-based antioxidant, 2.0 mass % of sulfonic acid and a sulfonate-based rust preventative, a suitable content of viscosity index improver (a butyl-based polymer) for adjustment of viscosity, and the remainder a synthetic hydrocarbon oil of a composition shown in Table 1. A grease according to Reference Example 2 had a consistency at 210, and all other greases had a consistency at 230.

Embodiment

A bearing, comprising a retainer made of nylon-66, 22 mm in outside diameter, and 8 mm in inside diameter, and a rolling element made of material of stainless steel series, was filled up with 130 mg of the grease described above. Measurement was made according to the following method before making an evaluation.

Comparative Example

A bearing, comprising a retainer made of a stainless steel, 22 mm in outside diameter, and 8 mm in inside diameter, and a rolling element made of material of stainless steel series, was filled up with 130 mg of the grease described above. Measurement was made according to the following method before making evaluation.

Method of Testing a Torque

A bearing was preloaded at 38.2 N in the axial direction, and measurement was made on a load to bring an outer ring to a standstill when rotating an inner ring at 60,000 rpm, thereby determining a torque.

Method of Testing Grease Leakage Amount

A bearing was preloaded at 38.2 N in the axial direction, and an inner ring was continuously rotated at 140° C.×20,000 rpm for a duration of 150 hours. A leakage amount of a grease was calculated on the basis of a reduction in the weight of the bearing, as measured after the test.

Method of Testing a Lubrication Life of the Grease

A bearing was preloaded at 38.2 N in the axial direction, and an inner ring was continuously rotated at room temperature×60,000 rpm. A lubrication life time of a grease was determined from a time when a current value of a motor exceeded a set value due to an excessive load imposed during the test.

Table 1 shows the composition and characteristics of various greases used in the tests.

TABLE 1

| class of grease | | Number of carbon atoms in a base oil | | | Kinematic viscosity |
|---|---|---|---|---|---|
| No. | object | 28 to 32 | 38 to 42 | 48 and over | mm²/s |
| 1 | * | 5 | 25 | 70 | 55 |
| 2 | * | 3 | 22 | 75 | 60 |
| 3 | ref. | 14 | 56 | 30 | 30 |
| 4 | ref. | 14 | 56 | 30 | 30 |
| 5 | ref. | 14 | 56 | 30 | 50 |
| 6 | ref. | 7 | 37 | 56 | 42 |
| 7 | ref. | 4 | 30 | 66 | 48 |
| 8 | ref. | 2 | 23 | 75 | 58 |
| 9 | ref. | 1 | 16 | 83 | 69 |

Remark: * indicates one blended for filling up a high speed rolling bearing according to the invention The construction and characteristics of the bearing according to the invention, and the composition the grease used are summed up and shown in Table 2.

TABLE 2

| | Type of bearing | | Grease | | Torque × $10^{-2}$ Ncm | | Lubrication life of grease | Anderon value | | |
|---|---|---|---|---|---|---|---|---|---|---|
| | Rolling elements | Retainers | Ref. No. of grease filled in | reduction ratio (mass %) | 50000 (rpm) | 60000 (rpm) | (hrs.) | L | M | H |
| Embodiment 1 | Steel ball | Nylon 66 | 1 | 20.4 | 18.62 | 23.52 | 700 and over | 1.4 | 1.3 | 1.0 |
| Embodiment 2 | Steel ball | Nylon 66 | 2 | 22.7 | 16.66 | 23.52 | 700 and over | 1.4 | 0.8 | 0.8 |
| Embodiment 3 | Ceramic | Nylon 66 | 1 | 15.6 | 14.7 | 16.66 | 700 and over | 1.0 | 0.6 | 0.6 |
| Comparative Example 1 | Steel ball | Stainless street | 2 | 28.8 | 15.68 | 17.64 | 620 | 2.0 | 2.5 | 2.5 |
| Ref. Embodiment 1 | Steel ball | Nylon 66 | 3 | 41.0 | 17.64 | 22.54 | 230 | 1.7 | 1.6 | 1.5 |
| Ref. Embodiment 2 | Steel ball | Nylon 66 | 4 | 37.2 | 13.72 | 25.48 | 340 | 1.7 | 1.6 | 1.6 |
| Ref. Embodiment 3 | Steel ball | Nylon 66 | 5 | 38.5 | 14.7 | 20.58 | 260 | 1.8 | 1.6 | 1.6 |
| Ref. Embodiment 4 | Steel ball | Nylon 66 | 6 | 30.2 | 12.74 | 21.56 | 370 | 1.6 | 1.6 | 1.5 |

TABLE 2-continued

| | Type of bearing | | Grease | | | | Lubrication | Anderon value | | |
|---|---|---|---|---|---|---|---|---|---|---|
| | Rolling elements | Retainers | Ref. No. of grease filled in | reduction ratio (mass %) | Torque × 10⁻² Ncm | | life of grease (hrs.) | value | | |
| | | | | | 50000 (rpm) | 60000 (rpm) | | L | M | H |
| Ref. Embodiment 5 | Steel ball | Nylon 66 | 7 | 28.2 | 12.74 | 24.5 | 380 | 1.5 | 1.5 | 1.5 |
| Ref. Embodiment 6 | Steel ball | Nylon 66 | 8 | 20.1 | 20.58 | 40.18 | 650 | 1.5 | 1.4 | 1.4 |
| Ref. Embodiment 7 | Steel ball | Nylon 66 | 9 | 17.0 | 49< | 49< | 670 | 1.4 | 1.4 | 1.4 |

As shown in Table 1 and Table 2, it is evident that as compared with a bearing comprising retainers made of stainless steel, bearings comprising retainers made of a polyamide have peculiar characteristics against a grease satisfying requirements as specified within the scope of the accompanying claims of the invention.

That is, in the cases of Embodiments 1 to 3, wherein use was made of a grease using a base oil of a synthetic hydrocarbon oil having a kinematic viscosity at 40° C. in a range of 50 to 70 mm²/s, and containing 3 to 6 mass % of hydrocarbon molecules containing 28 to 32 carbon atoms, it was found that the torque, even at high revolutions, was low, the leakage amount of the grease was little, and the life of the bearing was lengthened.

In contrast, in the case of Reference Example 1, wherein use was made of a grease using a base oil of a synthetic hydrocarbon oil containing 14 mass % of hydrocarbon molecules containing 28 to 32 carbon atoms and having a kinematic viscosity less than 50 mm²/s, it was found that the torque at high revolutions was low. However, the leakage amount of the grease increased and the life of the bearing was shortened.

In the case of Reference Example 2 wherein use was made of the grease for use in Reference Example 1, rendered harder to a consistency of 210, it was found that a leakage amount of the grease was slightly less and the life of the bearing was a little longer. However, the torque at high revolutions was high. As is evident from the case of Comparative Example 1, such a peculiarity was not observed with respect to a bearing comprising retainers made of stainless steel.

In the case of Reference Example 3 wherein a bearing comprises a retainer made of a polyamide and a grease composed of the same base oil as that for Reference Example 1 or 2 with a butyl-based polymer added thereto, thereby raising the kinematic viscosity at 40° C. to 50 mm²/s, it was found that the torque at high revolutions was low. However, the leakage amount of the grease increased, thus shortening the life of the bearing.

In the case of Reference Example 4 wherein use was made of a grease based on a synthetic hydrocarbon oil containing 7 mass % of hydrocarbon molecules containing 28 to 32 carbon atoms and having a kinematic viscosity less than 50 mm²/s, it was also found that the torque at high revolutions was low. However, the leakage amount of the grease increased, thus shortening the life of the bearing.

In the case of Reference Example 5 wherein use was made of a grease based on a synthetic hydrocarbon oil containing 4 mass % of hydrocarbon molecules containing 28 to 32 carbon atoms and having a kinematic viscosity less than 50 mm²/s, it was also found that the torque at high revolutions was low. However, the leakage amount of the grease increased, thus shortening the life of the bearing.

In the case of Reference Examples 6 and 7 wherein use was made of a grease based on a synthetic hydrocarbon oil containing less than 3 mass % of hydrocarbon molecules containing 28 to 32 carbon atoms, although the kinematic viscosity thereof was in a range of 50 to 70 mm²/s, it was found that a leakage amount of the grease was less and the life of the bearing was longer. However, the torque at high revolutions became higher.

The test results shown above indicate that, with a high speed rolling bearing comprising a retainer made of a polyamide, in order to manufacture one having a low torque, a small leakage amount of a grease, and a long life, it is necessary to use a synthetic hydrocarbon oil having a kinematic viscosity at 40° C. in a range of 50 to 70 mm²/s and containing 3 to 6 mass % of hydrocarbon molecules containing 28 to 32 carbon atoms as a base oil of the grease.

Thus, the high speed rolling bearing according to the invention has advantageous effects such as a low rotation torque, small leakage amount of the grease and long life thereof. Particularly, in the case of using the same as a bearing for a cleaner revolving at not less than 50,000 rpm, the advantageous effects are particularly pronounced.

What is claimed is:

1. A high speed rolling bearing comprising retainers disposed so as to surround respective rolling elements between an outer member and an inner member, the respective rolling elements rolling against a first contact face which is a contact face thereof with the outer member as well as a second contact face which is a contact face thereof with the inner member, wherein the retainers are made of a polyamide, and retain a grease composition, composed of a urea compound thickener and a poly α-olefin base having a kinematic viscosity at 40° C. in a range of 50 to 70 mm²/s, and containing 3 to 6 mass % of hydrocarbon molecules containing 28 to 32 carbon atoms, said bearing operating at a speed of not less than 50,000 rpm.

2. A high speed rolling bearing comprising retainers disposed so as to surround respective rolling elements between an outer member and an inner member, the respective rolling elements rolling against a first contact face which is a contact face thereof with the outer member as well as a second contact face which is a contact face thereof with the inner member, wherein the retainers are made of a polyamide, and retain a grease composition, composed of a urea compound thickener and a poly α-olefin base oil having a kinematic viscosity at 40° C. in a range of 50 to 70 mm²/s, and containing not less than 70 mass % of hydrocarbon molecules containing not less than 48 carbon atoms as well as 3 to 6 mass % of hydrocarbon molecules containing 28 to 32 carbon atoms, said bearing operating at a speed of not less than 50,000 rpm.

3. A high speed rolling bearing according to claim 1, suitable for use in a cleaner.

4. A high speed rolling bearing according to claim 2, suitable for use in a cleaner.

5. A high speed rolling bearing according to claim 1, wherein said retainers are made of Nylon-66.

6. A high speed rolling bearing according to claim 2, wherein said retainers are made of Nylon-66.

7. A high speed rolling bearing according to claim 1, wherein the urea compound has two urea bonds in one molecule.

8. A high speed rolling bearing according to claim 2, wherein the urea compound has two urea bonds in one molecule.

* * * * *